M. H. LYONS.
MULTIPLE CUTTER LATHE.
APPLICATION FILED MAY 27, 1916.

1,294,500.

Patented Feb. 18, 1919.
5 SHEETS—SHEET 1.

Inventor:
Michael H. Lyons
by Geo. V. Maxwell
Attorney.

M. H. LYONS.
MULTIPLE CUTTER LATHE.
APPLICATION FILED MAY 27, 1916.

1,294,500.

Patented Feb. 18, 1919.
5 SHEETS—SHEET 3.

Inventor:
Michael H. Lyons,
by Geo. W. Maxwell
Attorney.

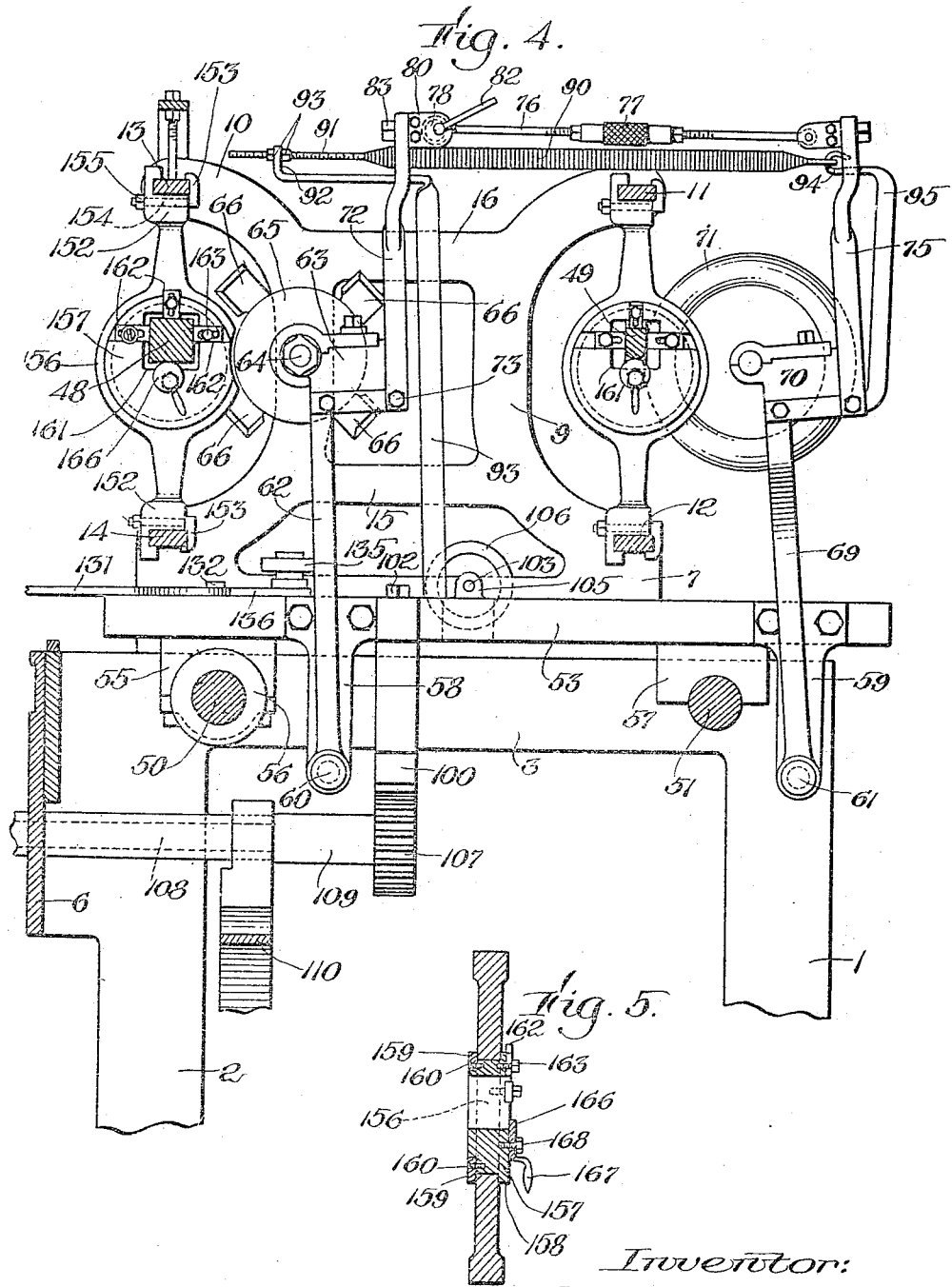

M. H. LYONS.
MULTIPLE CUTTER LATHE.
APPLICATION FILED MAY 27, 1916.

1,294,500.

Patented Feb. 18, 1919.
5 SHEETS—SHEET 5.

Inventor:
Michael H. Lyons,
by Geo. H. Maxwell
Attorney

UNITED STATES PATENT OFFICE.

MICHAEL H. LYONS, OF BROCKTON, MASSACHUSETTS.

MULTIPLE-CUTTER LATHE.

1,294,500.  Specification of Letters Patent.  Patented Feb. 18, 1919.

Application filed May 27, 1916. Serial No. 100,330.

*To all whom it may concern:*

Be it known that I, MICHAEL H. LYONS, a citizen of the United States, and resident of Brockton, county of Plymouth, and State of Massachusetts, have invented an Improvement in Multiple-Cutter Lathes, of which the following description, in connection with the accompanying drawings, is a specification, like letters on the drawings representing like parts.

My present invention is an improved automatic turning lathe capable of employing a plurality of cutters arranged for simultaneous operation. It is also an important object of the invention to provide an automatic lathe having means to follow a templet or pattern, of substantial length, together with suitable and adjustable supporting devices between the spindle and "live center" of the turning lathe mechanism.

My machine is particularly valuable in turning out, automatically, a relatively long piece of work, such as the wooden gun stocks for use in the manufacture of army rifles, shot guns, and the like, wherein an unsymmetrical contour must be formed. The machine is also suitable for turning out any long article, such as columns, furniture articles, table legs, or the like, at a great saving in time and therefore providing increased output for approximately the same power and floor space used. The invention contemplates the employment of a plurality of cutters, at least two, and if desired, more, each cutter adapted to work on a predetermined portion of the stock as said cutters and stock are fed relatively to each other. Furthermore, each cutter is constructed and arranged to follow, automatically, the particular portion of the model to be reproduced during the line of feed of such cutter, irrespective of the contour being produced by an adjacent cutter. Thus in the manufacture of army gun stocks, for example, wherein a gun stock from four to five feet long is required, my machine enables a plurality of cutters to be simultaneously employed on adjacent sections of the stock and requires but a short feeding movement for each cutter. Thus, if four cutters are applied on a four foot gun stock, the entire stock is turned in one-fourth the time which would be required in employing a single cutter, and yet each cutter will follow exactly the desired contour of that portion of the model which it is reproducing. Furthermore, if two cutters, for example, are employed, my machine contemplates the provision of means whereby the two cutters may be set to cut a predetermined section, or one-half the length of the gun stock, and then re-set to cut the remaining half. My invention thus enables such work to be rapidly and accurately done from three to four times as fast as in prior machines; which prior machines have relied upon a single cutting saw which was fed for the entire length of the work in the ordinary manner of a turning lathe. As the practicable feeding speed of such turning lathes is comparatively slow, and a single cutting tool required frequent re-adjustments throughout the length of such stock as in making an army rifle, and as my machine can have the different cutters specially set for different parts to be turned and then all operated simultaneously for only a short line of feed, the capacity for increased speed and output will be readily appreciated.

Other features of the invention, consist in novel means for quick and accurate adjusting of the connecting bars between the model wheel and cutterhead, mounting of the cutterheads to facilitate the limit of feeding action, means to throw both cutterheads out of contact with the work for longitudinal adjustment, and the adjustable supporting devices for middle portions of long stock which may be rotating eccentrically to the axes of the live center.

Other details of construction, novel combinations of parts, and advantages, will be hereinafter more fully pointed out and claimed.

Referring to the drawings illustrating a preferred embodiment of the invention as applied to a machine for turning out gun stocks, Figure 1 is a front elevation;

Fig. 4 is a cross sectional view on the line 4—4 of Fig. 2, looking in the direction of the arrow;

Fig. 5 is a cross sectional view showing a detail of construction of the middle supporting device for the work, which, at such support, may be rotating eccentrically to the spindle axis;

Figure 1:
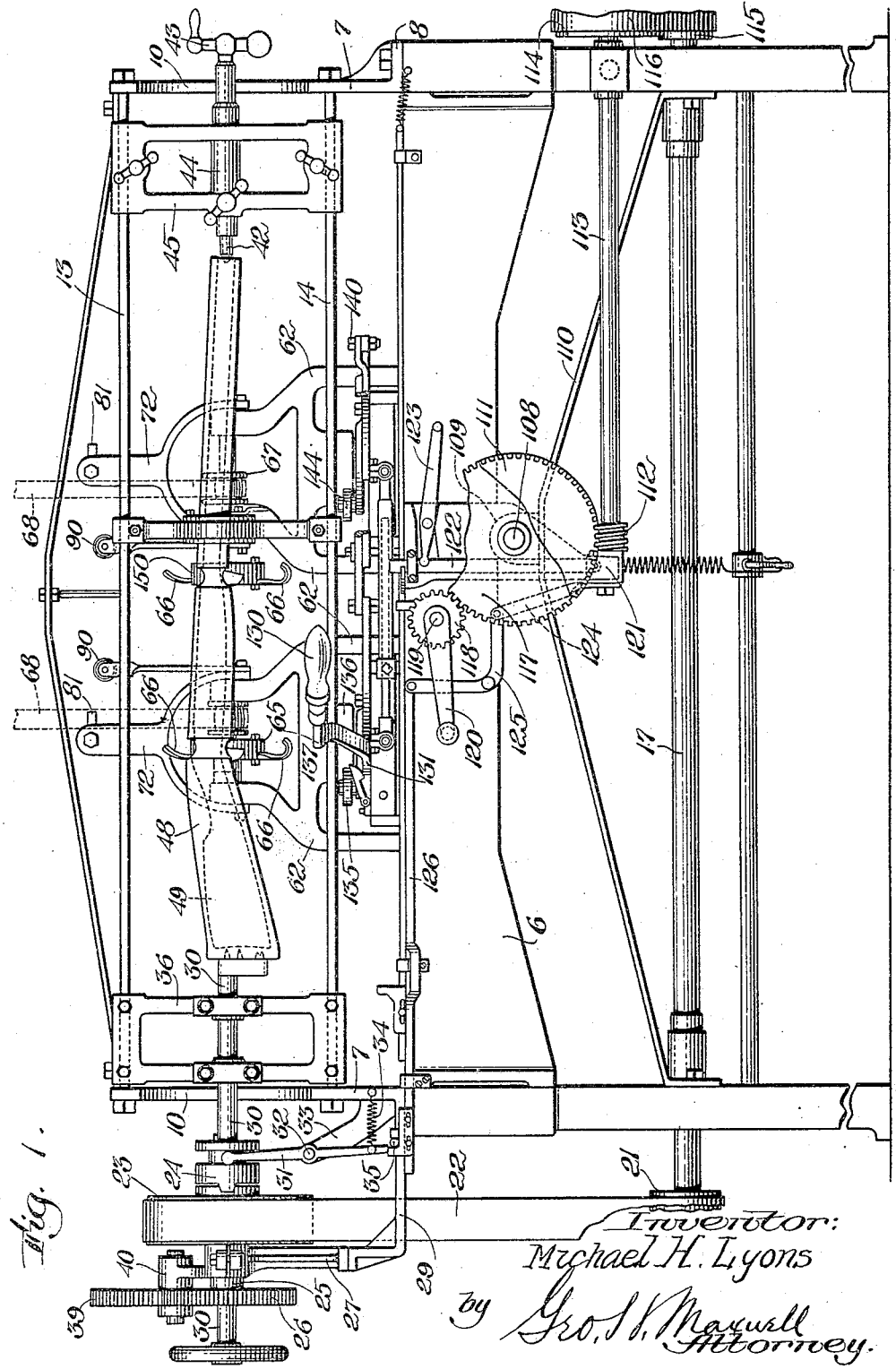

The turning lathe illustrated in the drawings comprises a rigid framework mounted on supporting standards 1 and 2 at either end connected by a top crossbar 3 and an intermediate brace 5, each pair of standards 1, herein shown as at the back of the machine, being connected longitudinally by a brace 6. An upstanding bracket 7 is bolted to each of the top end supports 3 by lugs 8, the said brackets having suitable side arms 9 and 10 and being connected with each other at the upper and lower sides of said arms by braces 11 and 12 at the rear of the machine joining corresponding bracket arms 9, 9, and similar braces 13 and 14 at the front of the machine joining the corresponding outer and lower portions of the brackets, 10, 10. Cross braces 15 and 16 in each bracket afford a strong and rigid brace for the pairs of arms 9 and 10.

Figure 2:
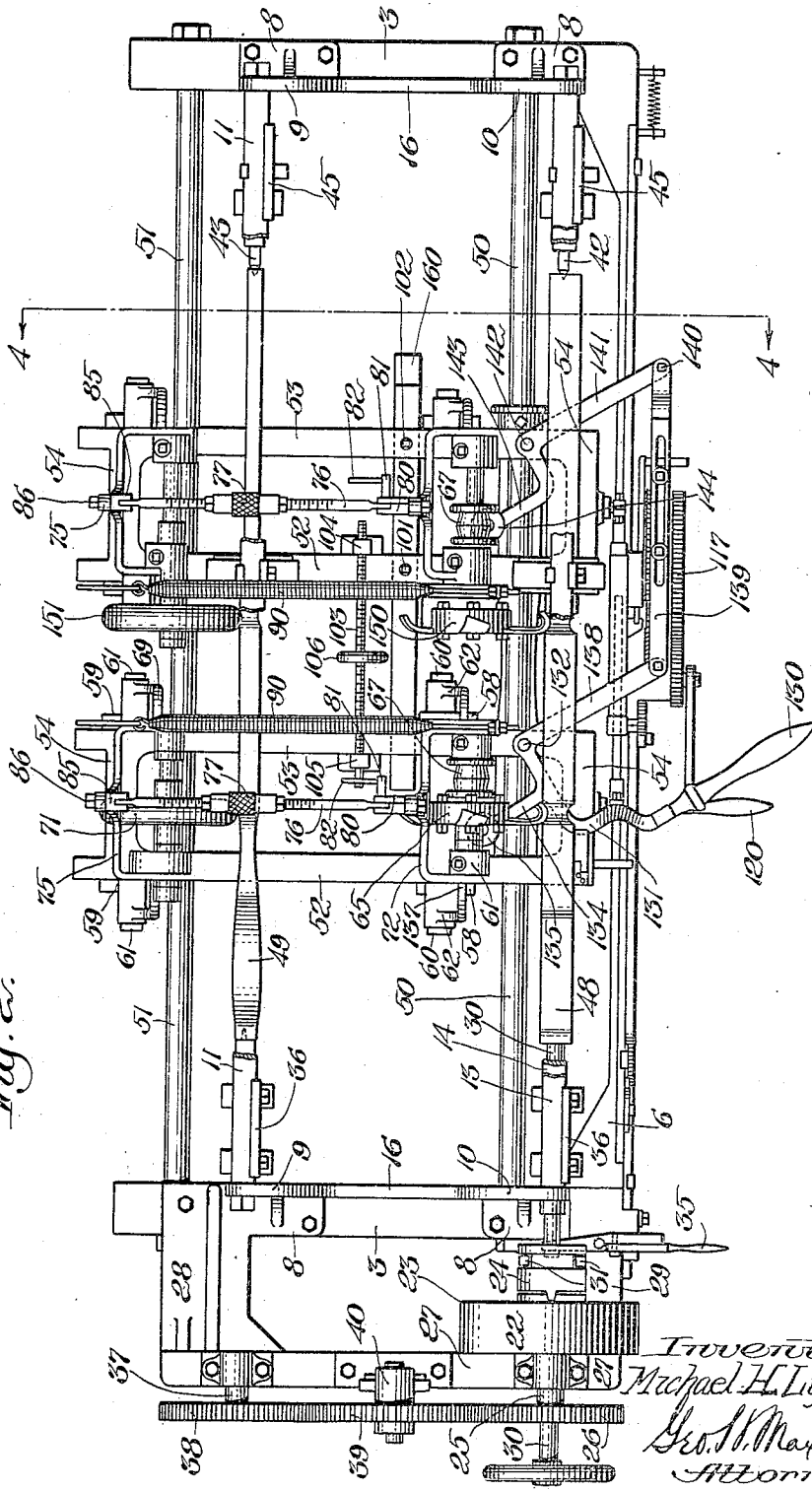
Fig. 2 is a plan view.
Figure 3:
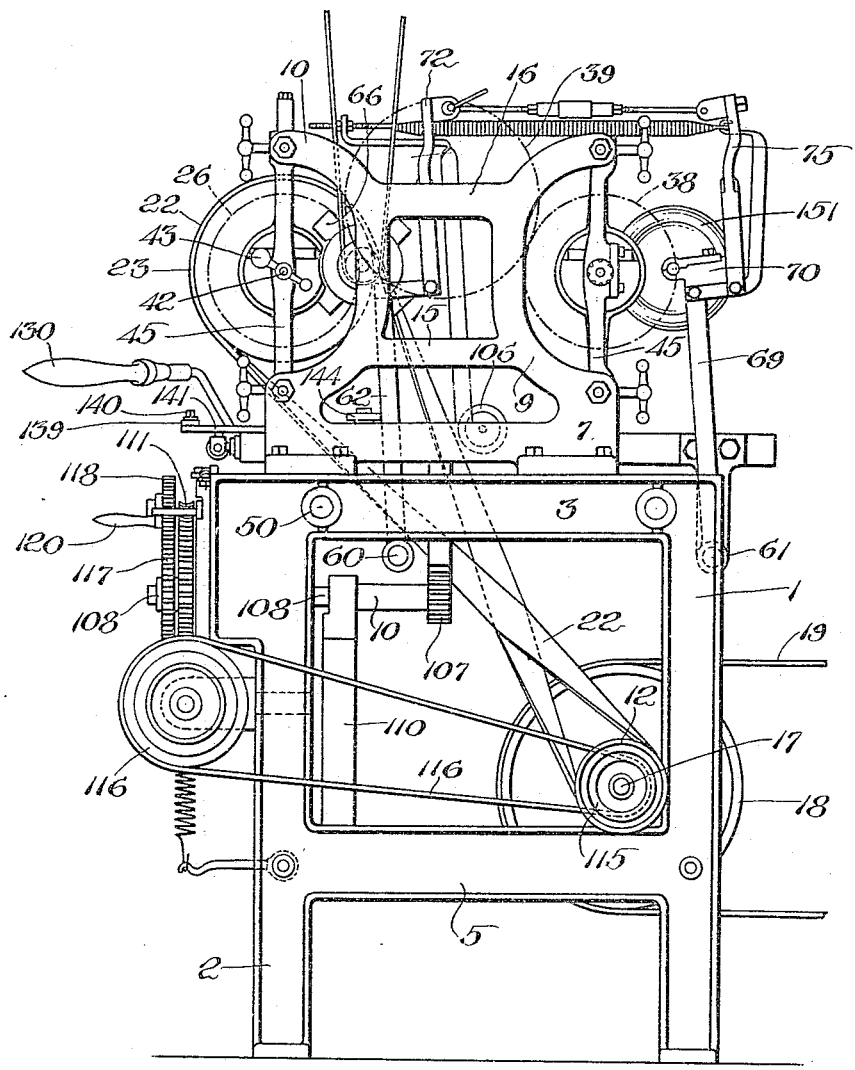
Fig. 3 is an end view looking from the right of Figs. 1 and 2.
Figure 6:
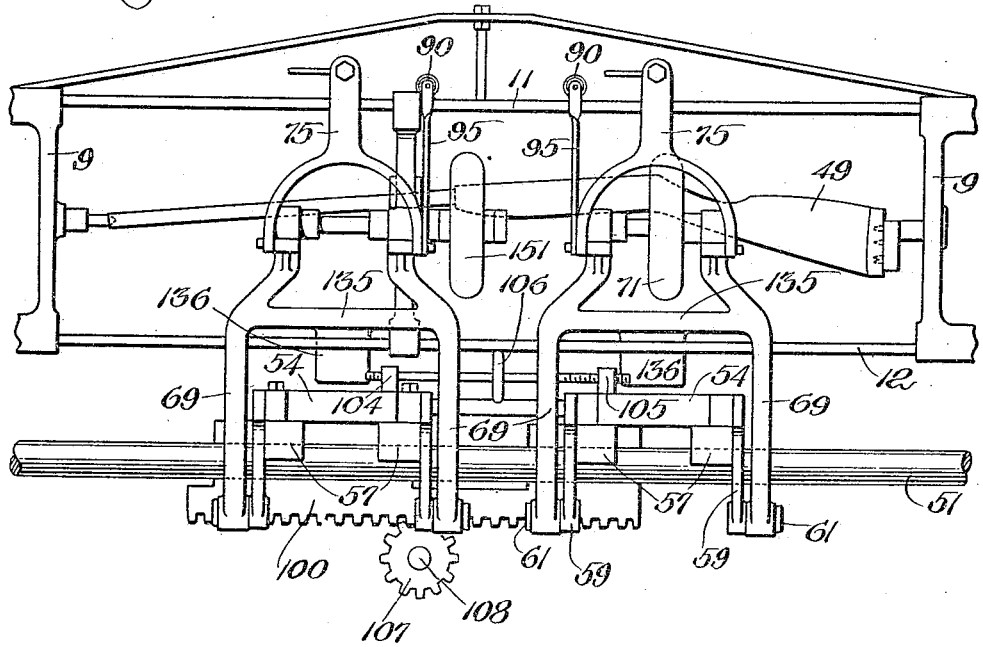
Fig. 6 is a fragmentary rear view of the model wheels.

Mounted in suitable journal bearings in the rear of the legs 1 is a power shaft 17 carrying a pulley 18 connected by belts 19 to any suitable source of power at one end and carrying a pulley 21, connected by a belt 22 with a freely rotating pulley 23 adapted to be connected by a clutch 24 with a shaft 25 carrying a gear wheel 26; both said shaft and pulley are mounted in suitable bearings on a bracket 27 at one end of the frame, shown at the left, viewing Figs. 1 and 2, said bracket extending across the end of the machine and being supported by side arms 28 and 29, bolted to the adjacent top portion 3 of the frame; the supporting arms 28 and 29 may conveniently be cast integrally with the adjacent lugs 8, 8, of the bracket 7, and as this is an economical and preferable construction, I have so shown the same. The shaft 25 is bored to receive the live center shaft 30, the clutch 24 being keyed onto the sleeve shaft 25 and operated by a forked lever 31, pivoted at 32 on a short arm 33 secured to the adjacent bracket 7. The spring 34 normally tends to throw said clutch 24 into engagement with the hub of the pulley 23, as clearly shown in Figs. 1 and 2, a hand lever 35 serving to throw out the clutch against the tension of the spring 34. The mounting for the pulley 23 and turning spindle or live center shaft 30, as just described, is arranged at the front, in alinement with the longitudinal connecting braces 13 and 14, to which braces is secured a spindle support 36. At the rear of the machine and in line with the connecting braces 11 and 12, and supported by a bracket 36, a duplicate of that already described, is mounted a second spindle or live center for the model or pattern, said spindle 37 carrying a gear wheel 38 which is adapted to mesh with an intermediate gear wheel 39 mounted on a bearing 40 carried by the bracket 27, which intermediate gear wheel meshes with 26 and thus serves to rotate both spindles 25 and 27 in the same direction and at the same speed, said gears being equally toothed.

At the opposite end of the framework and in alinement with the spindles 30 and 37 are provided the usual centers 41 and 42 respectively, which have the usual arrangement for longitudinal adjustment, and operating handles 43, each being supported in a bearing 44 carried by brackets 45 secured to the respective longitudinal members 13 and 14 for the center 42 and 11 and 12 for the center 41, similar to the brackets 36 already described.

Between the spindle 30 and center 42 is fitted a roughly shaped blank 48 of special length, size and outline to be turned into a gun stock corresponding with the model 49 which is similarly mounted between the spindle 37 and center 41 at the rear of the machine, and I provide multiple cutters to operate on said blank and a corresponding multiple of guide or model wheels to control the action of said cutters by bearing upon the pattern or model 49 at the rear of the machine, together with feeding means to feed both cutterhead and model and preferably each set of cutterheads and models longitudinally and simultaneously. As each cutterhead and its corresponding model is substantially alike, excepting for details and arrangement of mounting of the cutterhead, I will herein designate the two sets shown by duplicate reference characters. Both the cutterheads and the model or pattern wheels must be mounted for oscillation to follow the contours of the pattern while being fed lengthwise of the pattern, and to this end I provide a rod 50 secured at the front of the machine and a similar rod 51 secured at the rear of the machine. A carrier comprising cross braces 52 and 53 is adapted to span the width of said rods 50 and 51 and to rest upon each, being united at the ends by cross brace 54. A depending lug 55 fits upon the collar 56 surrounding the front rod 50 and a similar lug 57 is secured to the cross bars 53 in position to raise and slide upon the rear rod 50, thus providing a slidable carriage on which is mounted a cutter and a model wheel. As both cutter and model wheel must be mounted to oscillate and in unison, pivotal mountings therefor on the carriage are made. Depending lugs 58 and 59 at the front and rear of the crossbars 52 and 53 carry at their lowermost portions studs 60 and 61 respectively. From the studs 60 links 62 extend upwardly and at their uppermost portion carry journal boxes 63 in which the shaft 64 is mounted, carrying the cutterhead 65 and cutters 66. A pulley 67 is also arranged intermediate said bearings, to which a belt 68, to any suitable overhead source of power, is led so that the cutterheads 65 are rotated at high speed and independently of the driving mechanism of the rest of the machine. The link 62 and mountings for the shaft 64 are arranged substantially in the same horizontal plane as that of the axis of the spindle 30 and center 42. Links 69, similar to the links 62, are mounted on the rear studs 61, extending upwardly, and carrying supports 70 for the model wheels 71, which wheels are mounted for free rotation within the supports 70.

Figure 7:
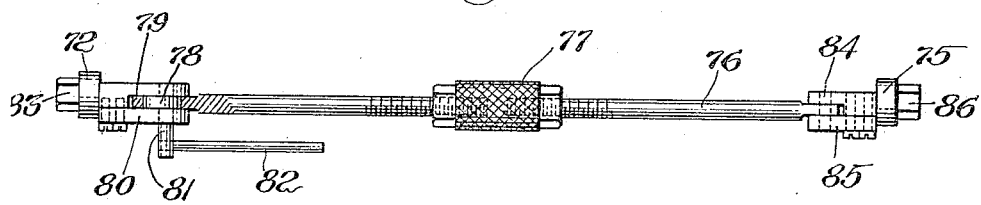
Fig. 7 is an enlarged detail view of the adjusting bar or connecting rod between the model wheels and the cutterhead.

In order to connect the rocking supports 63 for the cutter and 70 for the model wheel, I provide a yoke 72 bolted at 73 to the cutterhead support 63 and extending upwardly as clearly shown in Figs. 1 and 4. A similar yoke 75 is fitted to the pattern wheel support 70 and these two yokes are joined by a connecting rod 76 (see Fig. 7). I prefer to make this connecting rod in two sections with the center joined by a right and left threaded adjusting screw 77, to give desired adjustment. I also prefer to provide adjusting means which will enable a ready and finer adjustment to be secured between the yokes 75 and 72. This consists in an eccentric wheel 78 arranged in a correspondingly eccentric strap 79 which may be formed at either end of the connecting bar sections and fitted within the double member 80, the two parts of this member being held together by screws (see Fig. 7) with sufficient friction on the wheel 78 to hold it wherever moved on its pivot 81, said wheel 78 being arranged and to be oscillated by a handle 82. The forked member 80 is secured to its adjacent yoke by a threaded steam and bolt connection as indicated at 83. By this means a slight oscillation of the handle 82 rocks the eccentric wheel 78 with the strap bearing therefor and serves to adjust the length of the connecting rod 76, holding the same where thus adjusted, as will be readily understood. The opposite end of the connecting rod 76 is fitted at 84 to a forked member 85 secured to its adjacent yoke 75 by a bolt 86.

In order to hold the pivoted wheel 71 and cutter 76 into yielding engagement with the pattern 49 and blank 48 respectively, a strong spring 90 is arranged, secured at one end to a threaded rod 91 passing through a bracket 92 and held in adjusted position by check nuts 93 at the front of the machine, said bracket being carried by an arm 93ª, bolted to the crossbar 53 of the carrier and with the other end of the spring 90 engaged in a hook 94 carried by an arm 95 and bolted to the support 70. The spring thus directly acts to hold the model wheel 71 into firm engagement with the pattern 49 and through the connecting rod 76 similarly acts upon the cutterhead.

Each carriage, cutter and pattern wheel are similarly constructed and as many of such carriers with a set of cutterhead and pattern wheels thereon, as just described, as is deemed necessary for the length and speed of the work required, may be fitted on the members 50 and 51. I have herein shown two such carriers, but it will be appreciated that an important feature of my invention is the provision of a plurality of such working members. In order to feed the carrier, or carriers, lengthwise of the work, any satisfactory feeding device may be employed. I prefer to use the rack and pinion, as herein shown. A rack 100 is shown secured to one of the carriers on the underside, being bolted to the cross bars 52 and 53 by bolts 101 and 102, respectively, said rack being of suitable length for the extent of feed desired. I prefer to secure such feeding rack to one carrier and then to connect said carrier to its adjacent carrier or carriers, thus insuring uniformity of feeding action from the engagement of the single set of teeth on such rack 100, instead of having a plurality of racks on each carrier. As shown in Fig. 1, a suitable connection between two carriers is a threaded rod 103 fitted into a correspondingly threaded lug 104 on the cross-bar 52 of one carrier and with its other end similarly fitted into a lug 105 on the crossbar 53 of the adjacent carrier. A turning wheel 106 keyed to said rod facilitates the adjustment of the carriers, toward and from each other, as may be desired. To effect the feeding movement of said carriers and their respective cutterheads and pattern wheels, a pinion 107 is arranged to mesh with the teeth in the bottom of the rack 100, said pinion being mounted on a shaft 108, supported in a bearing 109 carried by a brace 110, approximately in a longitudinal center of the machine. On the outer end of the shaft 108 is keyed a geared wheel 111 adapted to mesh with a worm 112 carried on a shaft 113 and receiving power from a pulley 114 belted to a pulley 115 by the belt 116 mounted on the power shaft 17. A slow feeding drive is thus provided. In order to rotate said feed and the shaft 108 by hand, when desired, a gear 117 is also keyed on the shaft 108 adapted to mesh with a small gear 118 pivoted at 119 and operated by the handle 120.

To disconnect the feeding, the end of the worm shaft 113 is journaled in the box 121, which is provided with a slight vertical movement to throw the gear 112 out of mesh, said journal box being mounted on a vertically reciprocating slide 122, which slide is operated by the lever 123 (see Fig. 1). To effect simultaneous stopping of the feeding and turning movements, a connection comprising the link 124, bell-crank lever 125 and rod 126 is arranged to operate, simultaneously, the clutch lever 35 with the lever 123.

As it is often desirable to throw the cutters out of cutting action for inspection of the work or for moving the carriers longitudinally of the supporting rods 50 and 51, a handle 130 extends in front of the machine, being secured on a three-arm lever 131 pivoted at 132 on the arm 53 of one carrier and with one of its arms 134 carrying a roll 135 extending inwardly in position to bear upon a depending portion 136 of a crossbar 137 connecting the pivoted links 62 carrying the cutter support. Movement of the lever 130 to the left, viewing Figs. 1 and 2, brings the roll 135 into engagement with the part 136, thus swinging the cutter-head away from the work against the tension of the spring 90. To operate a plurality of cutters simultaneously by one handle, I connect the arm 138 of said lever 131 with a slide 139 suitably fitted at the front of the machine (see Fig. 2). At the other end of said slide is fitted at 140 a lever 141 mounted at 142 on the next adjacent carrier and having an arm 143 carrying a roll 144 for a similar purpose to that of 135, already described.

It will be noted that in the carrier shown at the left, viewing Figs. 1 and 2, the cutter-head 65 is mounted between the link supports 62 and the bearing for the same, whereas the cutterhead shown on the adjacent carrier, is mounted at an end of its supporting shaft outside of the link members 62. This particular mounting of cutter-head 150 and its corresponding pattern wheel 151 enables the two adjacent carriers to approach more nearly to the cutting centers of each other, than were each cutter-head mounted between the supporting links. Therefore, this construction enables a more advantageous and wider scope of adjustment to be obtained, permitting the cutter-head 150 to be positioned relatively closer to the cutterhead 65, when desired, and hence shortening the time and extent of feeding movement required for the cutter-head 65 to register with the work performed by the cutter 150. Where a pair of carriers and their cutters only are used, as in the machine of the drawings, this arrangement is of decided advantage.

In order to provide a suitable support for such long stock as that required for the machine to operate upon army gun stocks or the like, I have provided a novel form of support to be fitted to the stock intermediate the spindle ends, which support may be applied at any point desired, will permit the rotation of the stock while held firmly clamped to prevent springing away from the cutter, and which will also permit that portion of the stock thus supported and clamped to rotate eccentrically with relation to the spindle axis. This feature of the machine is specially important. This intermediate support may be adjusted along the longitudinal bars 13 and 14 to fit upon the stock being turned, and upon the bars 11 and 12 to hold the pattern. The device comprises a top and bottom edge portion of similar construction 152 (see Fig. 4) adapted to fit upon the cross-bars at any point and be clamped thereto, a movable jaw 153 being mounted on a bolt 154 and held in clamping engagement by a nut 155, as clearly illustrated. The central portion of the fixture is enlarged at 156 to receive a rotatable disk 157 therein. Preferably this disk is formed with a flange 158 on one side adapted to overlap the edge of the enlarged portion 156, and with a ring or washer 159 on the other side secured to the disk 158 by screws 160, thus holding the disk in engagement with the support. A suitable opening 161 is provided in the disk extending from approximately the center outwardly toward the circumference and adjacent this opening are provided slides 162, three being herein shown, each slide being held on the face of the disk 157 by headed bolts 163 having the shanks passed through elongated slots in the slides 162 and threaded into the disk. When the stock 48 (or pattern 49) is to be supported, the same is fitted through the opening 161, the slides 162 are adjusted to contact therewith and the bolts 163 tightened, holding the contained stock firmly in position. To provide a fourth quick clamping and tightening device, I provide a cam 166 (see Figs. 4 and 5) with a handle 167, said cam being fitted at 168 on the disk 157 so that a slight movement of the handle 167 will complete the clamping of the stock within the opening 161. The disk 157 thus clamped to the stock, rotates freely therewith, and firmly and rigidly supports said stock during such rotation, irrespective of the fact that the particular point at which the stock may be thus clamped is rotating eccentrically with relation to the spindle axis.

My invention is further described and defined in the form of claims as follows:

1. In a machine of the class described, a lathe spindle to hold and rotate stock, a similar lathe spindle to hold and rotate a pattern, a plurality of independent carriers, each carrier having a cutterhead mounted for rotation thereon independently of the other cutterheads, means to effect a relative feeding movement between said stock and carriers moving the carriers simultaneously, and independent means on each carrier adapted to engage the pattern at different points and control the cutting action of each cutterhead, in combination with means having a quick adjustment and a fine adjustment to control the relative positions of the pattern devices and the cutters, independently to each other.

2. In a machine of the class described, lathe mechanism to hold and rotate stock, a second lathe mechanism to hold and rotate a pattern in unison with the rotation of said stock, a plurality of carriers arranged for simultaneous feeding movement longitudinally of said stock and pattern, each carrier having a cutterhead mounted for rotative movement and pivoted on said carrier to move toward and from the stock, a model wheel mounted on each carrier and pivoted to move toward and from the pattern independently of other wheels, a plurality of adjustable connections from the said model wheel to said cutterhead on each carrier including an eccentric cam device and yielding means to maintain each model wheel in contact with the pattern at different points and independently of each other.

In testimony whereof, I have signed my name to this specification, in the presence of two subscribing witnesses.

MICHAEL H. LYONS.

Witnesses:
JOHN REID,
FRED S. SPRAGUE.

Copies of this patent may be obtained for five cents each, by addressing the "Commissioner of Patents, Washington, D. C."